(12) United States Patent
Hada et al.

(10) Patent No.: US 10,459,225 B2
(45) Date of Patent: Oct. 29, 2019

(54) DISPLAY DEVICE (71) Applicant: NIPPON SEIKI CO., LTD., Niigata (JP)

(72) Inventors: Makoto Hada, Niigata (JP); Tomoya Kuraishi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 15/760,126

(22) PCT Filed: Sep. 14, 2016

(86) PCT No.: PCT/JP2016/077165
§ 371 (c)(1),
(2) Date: Mar. 14, 2018

(87) PCT Pub. No.: WO2017/057001
PCT Pub. Date: Apr. 6, 2017

(65) Prior Publication Data
US 2018/0246324 A1 Aug. 30, 2018

(30) Foreign Application Priority Data
Sep. 30, 2015 (JP) ................................. 2015-193060

(51) Int. Cl.
*G02B 27/01* (2006.01)
*G02B 26/08* (2006.01)
(Continued)

(52) U.S. Cl.
CPC ......... *G02B 27/0101* (2013.01); *G02B 26/08* (2013.01); *G02B 27/01* (2013.01);
(Continued)

(58) Field of Classification Search
CPC .... G02B 27/0101; G02B 27/01; G02B 26/08; G09G 5/10; G09G 3/34; G09G 3/20; G03B 21/14
See application file for complete search history.

(56) References Cited

U.S. PATENT DOCUMENTS

2002/0118160 A1* 8/2002 Nakamura ........... H04N 5/7441
345/101
2002/0130786 A1* 9/2002 Weindorf .......... G02F 1/133603
340/815.45
(Continued)

FOREIGN PATENT DOCUMENTS

JP        H11-38378 A     2/1999
JP        2006-301368 A  11/2006
(Continued)

OTHER PUBLICATIONS

International Search Report dated Dec. 6, 2016 issued in International Patent Application No. PCT/JP2016/077165 (with English translation).
(Continued)

*Primary Examiner* — Mihir K Rayan
(74) *Attorney, Agent, or Firm* — McDermott Will & Emery LLP (57) ABSTRACT

A display device includes: a control unit that causes any one of light sources to emit light, each of the light sources emitting light of a different color, generates illumination light of a color from the light emitted from the light sources, using a field-sequential method in which the light sources for emitting light are switched in sequence, and reflects toward a screen, through a reflection unit, the light that corresponds to the display image from among the illumination light; a temperature detection unit for detecting the temperature of a display element; and a temperature adjustment unit for adjusting the temperature of the display (Continued)

element. The control unit stops supplying current to the light sources and supplies current at a first current value only to the temperature adjustment unit when the detected temperature is within a low-temperature or high-temperature non-displayed range of the display element.

4 Claims, 4 Drawing Sheets

(51) Int. Cl.
    *G03B 21/14*     (2006.01)
    *G09F 9/00*     (2006.01)
    *G09G 3/20*     (2006.01)
    *G09G 3/34*     (2006.01)
    *G09G 5/10*     (2006.01)

(52) U.S. Cl.
    CPC ............... *G03B 21/14* (2013.01); *G09F 9/00* (2013.01); *G09G 3/20* (2013.01); *G09G 3/34* (2013.01); *G09G 3/346* (2013.01); *G09G 5/10* (2013.01); *G09G 2320/041* (2013.01); *G09G 2330/021* (2013.01); *G09G 2330/025* (2013.01)

(56) References Cited

U.S. PATENT DOCUMENTS

| | | | |
|---|---|---|---|
| 2006/0192750 A1* | 8/2006 | Lai | G02F 1/133604 345/102 |
| 2010/0066979 A1* | 3/2010 | Miyazaki | G03B 21/14 353/52 |
| 2010/0245780 A1* | 9/2010 | Abe | G03B 21/14 353/85 |
| 2011/0032489 A1* | 2/2011 | Kimoto | G03B 21/16 353/56 |
| 2012/0098818 A1* | 4/2012 | Yoon | G09G 3/2007 345/212 |
| 2014/0232763 A1* | 8/2014 | Hada | G03B 33/08 345/690 |
| 2015/0092118 A1* | 4/2015 | Hada | G02B 26/0833 349/11 |
| 2015/0130853 A1* | 5/2015 | Hada | H04N 9/3155 345/690 |

FOREIGN PATENT DOCUMENTS

| | | |
|---|---|---|
| JP | 2012-212095 A | 11/2012 |
| JP | 2014-010417 A | 1/2014 |
| JP | 2014-229966 A | 12/2014 |
| WO | 2013/128722 A1 | 9/2013 |
| WO | 2017/038497 A1 | 3/2017 |

OTHER PUBLICATIONS

Extended European Search Report issued in corresponding European Patent Application No. 16851175.6-1209, dated Mar. 27, 2019.

\* cited by examiner

DISPLAY DEVICE

RELATED APPLICATIONS

This application is the U.S. National Phase under 35 U.S.C. § 371 of International Application No. PCT/JP2016/077165, filed on Sep. 14, 2016 which in turn claims the benefit of Japanese Patent Application No. 2015-193060 filed on Sep. 30, 2015, the disclosures of which applications are incorporated by reference herein.

TECHNICAL FIELD

The present invention relates to a display device, and more specifically to a display device for displaying images by spatial light modulation of light of plural colors from light sources by a DMD (Digital Micromirror Device) which is a spatial light modulation element.

BACKGROUND ART

Figure 1:
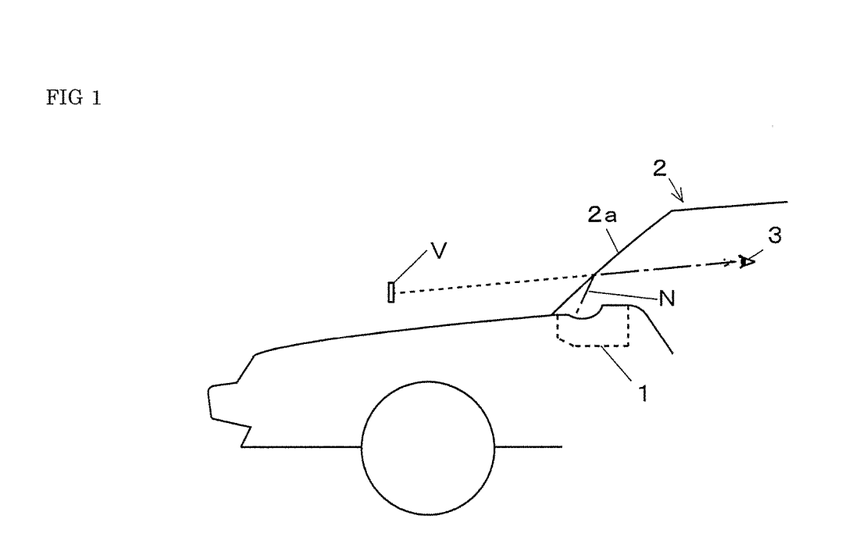
FIG. 1 is a schematic view of a display device.

Conventionally, there have been proposed various display devices called head-up display devices which project display images and display virtual images on a transflective surface called combiner or windshield of a vehicle (for example, PTL 1). As shown in FIG. 1, a head-up display device 1 is disposed in a dashboard of the vehicle, and display light N projected by the head-up display device 1 is reflected by a windshield 2a, so that a user 3 can visually recognize a virtual image V superimposed on a landscape.

CITATION LIST

Patent Literature

PTL 1: JP-A-2014-010417

SUMMARY OF INVENTION

Technical Problem

In such a head-up display device 1, as a spatial light modulation element for generating an image, the DMD which is a reflective display device may be used in some cases.

In the DMD, an operable temperature range (for example, −30° C. to 85° C.) is defined, and specifically at low temperatures (less than −30° C.), it has been impossible to display an image unless the DMD is warmed by a heating means such as a heater to be used after reaching an operable temperature.

Further, it has been necessary to drive the heater even at −30° C. or higher so that a temperature of the DMD is not out of the operable temperature range after the heater is turned off. In this state, when a light source such as an LED (light emitting diode) serving as illumination light for the DMD is simultaneously turned on in order to generate a display image, there has been a possibility that the maximum current consumption increases and eventually peripheral members are damaged when the heater of the display device is driven and a period while light source drive current is simultaneously supplied is long. In addition, there has been a problem that consumption current of the entire display device increases, as a low temperature state of the DMD continues and a time period while the heater is energized increases.

Therefore, in view of the above-mentioned problems, the present invention provides a display device capable of quickly adjusting the temperature of the DMD within the operable temperature range and reducing power consumption even within the operable temperature range of the DMD.

Solution to Problem

In order to solve the above-mentioned problems, the present invention is a display device for displaying a predetermined display image, including: a plurality of light sources for respectively emitting light of different colors; a display element including a plurality of reflection units capable of controlling an angle at which light is reflected; a control unit which causes any one of the plurality of light sources to emit light, generates illumination light of a desired color from light emitted from the plurality of light sources by a field-sequential method in which the light sources for emitting light are sequentially switched, and reflects light corresponding to the display image from among the illumination light toward a screen through the reflection unit; a temperature detection unit for detecting a temperature of the display element; and a temperature adjustment unit for adjusting the temperature of the display element, wherein when the temperature detected by the temperature detection unit is within a low-temperature or high-temperature non-display range of the display element, the control unit stops supply of current to the plurality of light sources and supplies a current having a first current value only to the temperature adjustment unit.

Further, the present invention is the display device, wherein when the temperature detected by the temperature detection unit is within an operable temperature range of the display element and is within a low-temperature or high-temperature display range, the control unit repeats a display period for generating the illumination light and a non-display period for turning off all of the plurality of light sources during display of the predetermined display image, and during the display period, the control unit supplies a current having a second current value smaller than the first current value to the temperature adjustment unit and supplies a current having a current value lower than a normal current value to the plurality of light sources.

Furthermore, the present invention is the display device, wherein during the non-display period, the control unit stops the supply of current to the plurality of light sources and supplies a current having a third current value equal to or lower than the first current value and higher than the second current value to the temperature adjustment unit.

Advantageous Effect of Invention

According to the present invention, it is possible to achieve an intended purpose, and to provide a display device capable of quickly adjusting the temperature of the DMD within the operable temperature range and reducing power consumption even within the operable temperature range of the DMD.

DESCRIPTION OF EMBODIMENT

Hereinafter, a display device of the present invention will be described based on an embodiment applied to a head-up display device 1 (hereinafter referred to as an HUD device 1) with reference to the attached drawings. (Note that the same reference numerals are attached to the same or corresponding portions as those in the background art, and detailed descriptions thereof will be omitted.)

Figure 2:
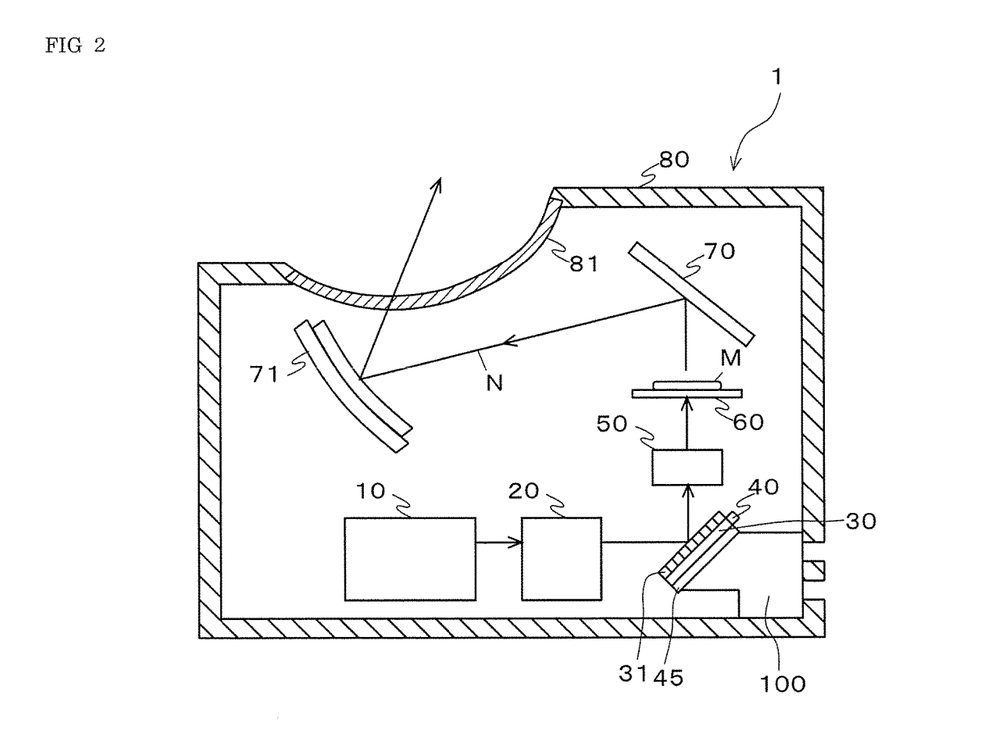
FIG. 2 is a cross-sectional view of the display device of a first embodiment of the present invention.

The HUD device 1 is mounted on a vehicle 2. The HUD device 1 is provided in a dashboard of the vehicle 2 and reflects display light N displaying a generated display image M by a windshield 2a which is a transflective surface, so that a user 3 can visually recognize a virtual image V indicating vehicle information or the like. The user 3 can visually recognize the virtual image V together with real scenery without averting a line of sight from the front.

The HUD device 1 includes an illumination device 10, an illumination optical system 20, a DMD 30 as a display element, a temperature detection unit 40, a heating means 45 as a temperature adjustment unit, a projection optical system 50, a screen 60, a plane mirror 70, a concave mirror 71 as a relay optical system, a cooling means 100 as a temperature adjustment unit, a housing 80 having a window portion 81 through which the display light N is emitted to the outside, and a control unit 90. Note that the display device 1 described in claims will be described as including the illumination device 10, the DMD 30, the temperature detection unit 40, the heating means 45, the cooling means 100, the control unit 90 and the like in the present embodiment.

Figure 3:
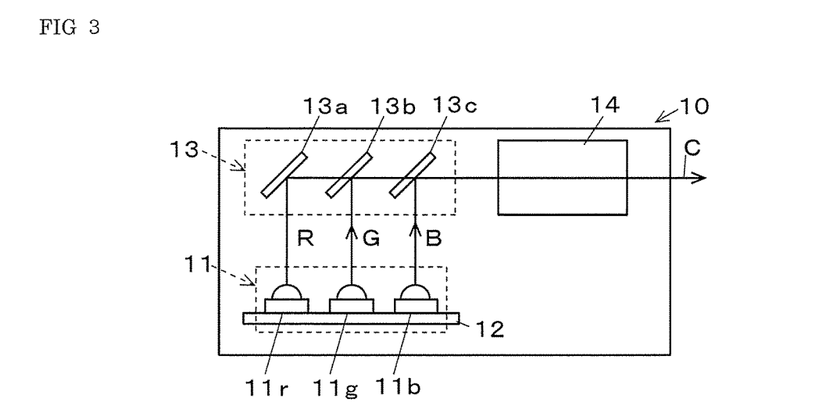
FIG. 3 is a conceptual diagram of an illumination device of the same embodiment.

As shown in FIG. 3, the illumination device 10 includes a light source 11, a circuit board 12 on which the light source 11 is mounted, an optical axis combining unit 13, and an uneven brightness reduction optical means 14.

The light source 11 is, for example, a light emitting diode (hereinafter referred to as an LED), and is composed of light sources 11r, 11g, 11b for emitting light of different colors. The light source 11 is composed of a red light source 11r emitting red light R, a green light source 11g emitting green light G, and a blue light source 11b emitting blue light B. In the present embodiment, the light sources 11r, 11g, 11b of each color are single light sources for each color, however, they may be composed of a plurality of light sources for each color.

The circuit board 12 is made of an aluminum substrate and is made of a printed circuit board. The light sources 11r, 11g, 11b are mounted on the circuit board 12.

The optical axis combining unit 13 includes a reflecting mirror 13a for reflecting light, and dichroic mirrors 13b, 13c, which includes mirrors having mirror surfaces on which thin films such as dielectric multilayer films are formed to transmit and reflect light, and aligns optical axes of each colored light emitted from the red light source 11r, the green light source 11g, and the blue light source 11b.

The uneven brightness reduction optical means 14 is composed of a mirror box, an array lens and the like, and reduces unevenness of light by diffusely reflecting, scattering or refracting the each colored light. In this way, the illumination device 10 emits illumination light C toward the illumination optical system 20 described below.

The illumination optical system 20 is composed of, for example, a concave lens and the like, and adjusts the illumination light C emitted from the illumination device 10 to a size of the DMD 30.

The DMD 30 includes a plurality of movable mirror elements 31 which are reflection units, and drives an electrode (not shown) provided under the mirror element 31 in a very short time of microsecond order, so that a mirror surface of each mirror element 31 is inclined by ±12 degrees around a hinge (not shown) as a fulcrum. When the mirror element 31 is ON, it is inclined at +12 degrees around the hinge as the fulcrum and reflects the illumination light C emitted from the illumination optical system 20 toward the projection optical system 50. When the mirror element 31 is OFF, it is inclined at −12 degrees around the hinge as the fulcrum and does not reflect the illumination light C toward the projection optical system 50. Therefore, by individually driving each mirror element 31 based on display image data indicating the display image M, the illumination light C is selectively projected toward the projection optical system 50, so that the display image M of a desired brightness and a desired color is generated on the screen 60.

In addition to two states of ON/OFF, when power of the HUD device 1 is turned off, intermediate control to be controlled to an intermediate point between an inclination at ON state and an inclination at OFF state is performed in each mirror element 31 of the DMD 30, and each mirror element 31 at this intermediate point is at 0 degrees position in the present embodiment.

Figure 4:
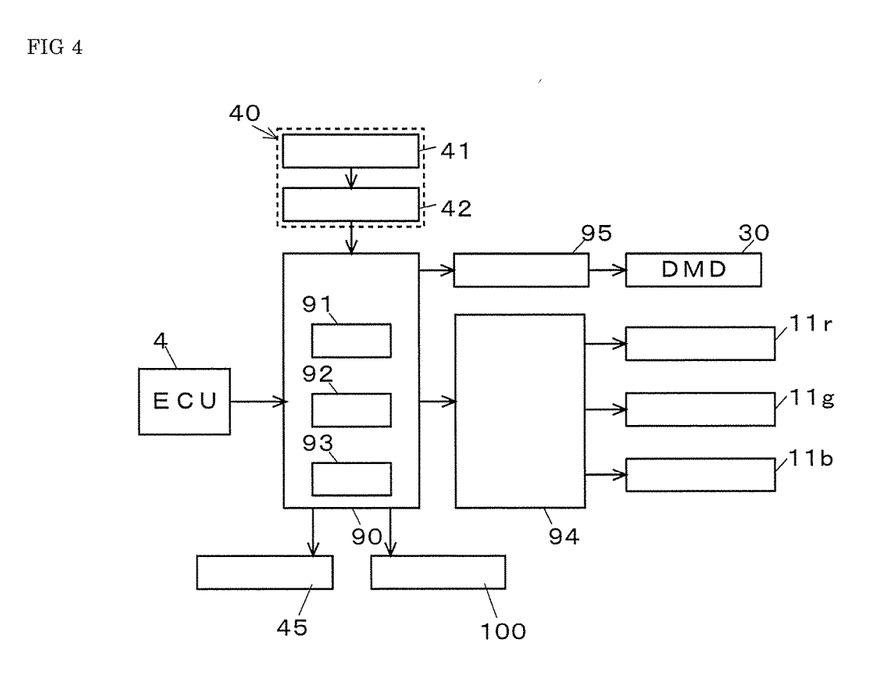
FIG. 4 is an explanatory diagram of an electrical configuration of the same embodiment.

The temperature detection unit 40 is composed of a temperature sensor 41 made of a thermistor or the like built in a ceramic portion of base substrate of the DMD 30, and an A/D converter 42. The temperature sensor 41 measures a temperature of the DMD 30, converts analog data output from the temperature sensor 41 into temperature data which is digital data by the A/D converter 42, and outputs the temperature data (hereinafter referred to as temperature T) to the control unit 90. It should be noted that the A/D converter 42 may be incorporated in the control unit 90.

Further, the temperature sensor 41 may not measure the temperature of the DMD 30, but may measure temperature in the housing 80 or around the housing 80, which affects the temperature of the DMD 30.

Further, the temperature sensor 41 may be disposed on a control board (not shown) on which the control unit 90 is mounted, and may measure the temperature of the DMD 30 from on the control board.

The heating means 45 is a kind of the temperature adjustment unit. The heating means 45 is formed in the ceramic portion of the base substrate of the DMD 30 and is made of a metal body such as tungsten. The DMD 30 is heated by applying an electric current to this metal body.

The projection optical system 50 is composed of, for example, a concave lens or a convex lens, and is an optical system for efficiently illuminating the screen 60 with the display light N of the display image M projected from the DMD 30.

The screen 60 is composed of a diffusion plate, a holographic diffuser, a microlens array and the like, and receives the display light N from the projection optical system 50 on a lower surface thereof, to display the display image M on an upper surface thereof.

The plane mirror 70 reflects the display image M displayed on the screen 60 to the concave mirror 71.

The concave mirror 71 reflects the display light N reflected by the plane mirror 70 on its concave surface, so that the display light N is emitted outside of the HUD device 1 from the window portion 81 of the housing 80. The virtual image V imaged by the concave mirror 71 has an enlarged size of the display image M displayed on the screen 60.

The cooling means 100 is composed of a blade (not shown) and a drive source such as a motor (not shown) for driving the blade. The cooling means 100 forcibly discharges air around the DMD 30 and lowers the temperature of the DMD 30 to cool the DMD 30.

The housing 80 is formed of a hard resin or the like, and is formed in a box shape having a window portion 81 of a predetermined size on an upper portion thereof. The housing 80 houses the illumination device 10, the illumination optical system 20, the DMD 30, the temperature detection unit 40, the heating means 45, the projection optical system 50, the screen 60, the plane mirror 70, the concave mirror 71, the cooling means 100 and the like at predetermined positions.

The control unit 90 may be housed in the housing 80, or may be disposed outside the housing 80 to be electrically connected to components inside the housing 80 by wiring or the like.

The window portion 81 is formed in a curved shape from translucent resin such as acrylic resin, and is attached to an opening of the housing 80 by welding or the like. The window portion 81 transmits light reflected by the concave mirror 71.

Next, electrical configuration of the HUD device 1 will be described with reference to FIG. 4.

The control unit 90 includes a processing unit 91 composed of a single or a plurality of FPGAs, a microcomputer, an ASIC or the like, a storage unit 92 for storing programs and data for driving the processing unit 91, and an input/output unit 93 for exchanging signals with a vehicle ECU 4 or the like via a network (not shown) such as a CAN (Controller Area Network) bus communication. The control unit 90 inputs an image signal from the vehicle ECU 4 via the input/output unit 93. The control unit 90 processes the input image signal and controls the illumination device 10 and the DMD 30 via an illumination driver 94 and a DMD driver 95 described below based on the image signal, to generate the display image M.

The vehicle 2 is provided with an illuminance sensor (not shown) for detecting illuminance around the user 3, and the control unit 90 inputs an illuminance signal of the illuminance sensor from the input/output unit 93 (illuminance signal input unit), reads illumination control data described below from the storage unit 92 based on the illuminance signal, and changes output of the light source 11 to adjust (modulate) the brightness of the display image M. Further, the control section 90 may input an operation signal of a light switch (not shown) of the vehicle 2 from the input/output unit 93, may estimate that ambient illuminance is low when the light switch is turned on, and the ambient illuminance is high when the light switch is turned off, and may change the output of the light source 11 based on the operation signal.

The storage unit 92 stores in advance illumination control data in which outputs of the light sources 11r, 11g, 11b are respectively associated with the illuminance signal. Note that the illumination control data is generated by calibration in consideration of individual differences of the light sources 11 at the time of manufacture.

The illumination driver 94 is composed of a driver and the like for driving the light source 11, and sequentially switches the light sources 11 of different colors (red light source 11r, green light source 11g, blue light source 11b) for each subframe SF at high speed based on the illumination control data input from the control unit 90. The illumination control data is data defining the output (drive current, light emitting period) and the like of the light source 11 in a subframe SF so that the display image M can obtain a desired display brightness and display color, and the illumination driver 94 controls the output based on the illumination control data so as to cause the light source 11 to emit the colored light of a desired light intensity for each subframe SF. Although detailed explanation in the present embodiment is omitted, the illumination driver 94 can control the light source 11 by PWM (Pulse Width Modulation) control.

The DMD driver 95 is composed of a driver and the like for driving the DMD 30, and turns on or off the individual mirror elements 31 of the DMD 30 according to the subframe SF based on display control data input from the control unit 90. The display control data is generated for the individual mirror elements 31 of the DMD 30, and is data that defines the subframe SF to be turned on, a period while the subframe SF is on (period while the subframe SF is kept on), and the like so that the mirror element 31 can display the desired display brightness and display color. The DMD driver 95 turns on each mirror element 31 only for a desired period of a desired subframe SF and turns off the mirror element 31 for other periods based on the display control data.

That is, in order to form the display image M, the illumination device 10 outputs the illumination light C (red light R, green light G, blue light B) at a desired output for each desired subframe SF, and illuminates the DMD 30. In order to generate the display image M, each mirror element 31 of the DMD 30 reflects the illumination light C toward the screen 60 at a desired timing for each mirror element 31. With such a configuration, colors are mixed by time division additive mixing using the red light R, the green light G, and the blue light B of the light source 11 as basic colors, so that the display image M is displayed in color.

As a method of generating the display image M in the HUD device 1 of the present invention, field-sequential color (hereinafter referred to as FSC) control is performed. In the FSC control of the present embodiment, a frame F which is a cycle for forming the display image M is set to less than $\frac{1}{60}$ seconds (60 Hz or more), that is higher than a critical fusion frequency to allow a person to visually recognize flicker. The frame F is divided into about $\frac{1}{180}$ seconds for each of the red light source 11r, the green light source 11g, and the blue light source 11b as a drive period. Further, the drive period ($\frac{1}{180}$ sec) of each color is divided into subframes SF of unequal periods so as to allow 8-bit time gradation. It should be noted that description of the FSC control in the present embodiment is merely an example and the FSC control is not limited to these descriptions.

Next, control contents of the control unit 90 will be described.

Figure 5:
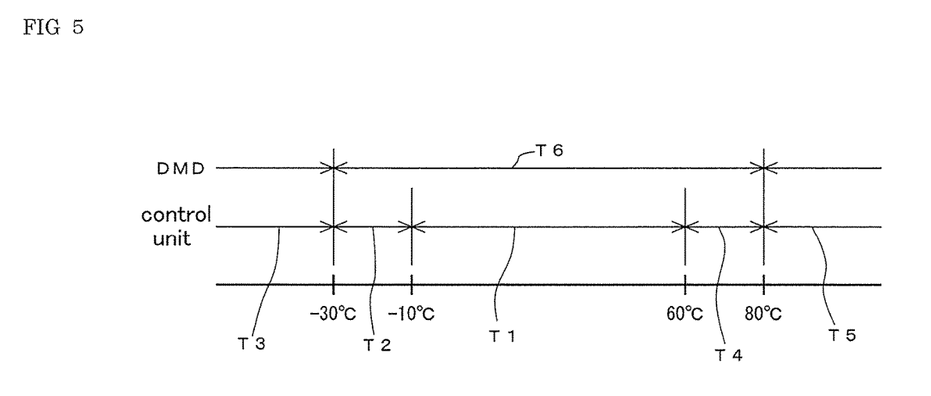
FIG. 5 is a diagram showing a state of a DMD and a control state of a control unit depending on a temperature of the DMD in the same embodiment.

As shown in FIG. 5, based on a detection result of the temperature sensor 41, when the temperature of the DMD 30 is in a range of less than −30° C. (low-temperature non-display range T3), the control unit 90 goes into a low-temperature non-display mode, when the temperature of the DMD 30 is in a range of −30° C. to −10° C. (low-temperature display range T2), the control unit 90 goes into a low-temperature display mode, and when the temperature of the DMD 30 is in a range of −10° C. to 60° C. (normal temperature range T1), the control unit 90 goes into a normal temperature mode.

Further, when the temperature of the DMD 30 is in a range of 60° C. to 80° C. (high-temperature display range T4), the control unit 90 goes into a high-temperature display mode, and when the temperature of the DMD 30 is in a range (high-temperature non-display range T5) exceeding 80° C., the control unit 90 goes into a high-temperature non-display mode.

That is, when the power of the HUD device 1 is on, the control unit 90 always monitors the temperature of the DMD 30, to be in one of the low-temperature non-display mode, the low-temperature display mode, the normal temperature mode, the high-temperature display mode, and the high-temperature non-display mode. Note that the normal temperature range T1 refers to a temperature range excluding the low-temperature display range T2 and the high-temperature display range T4 from an operating temperature range T6 (in this case, −30° C. to 80° C.) of the DMD 30. Further, the low-temperature non-display range T3 and the high-temperature non-display range T5 are outside the operating temperature range of the DMD 30.

Figure 6:
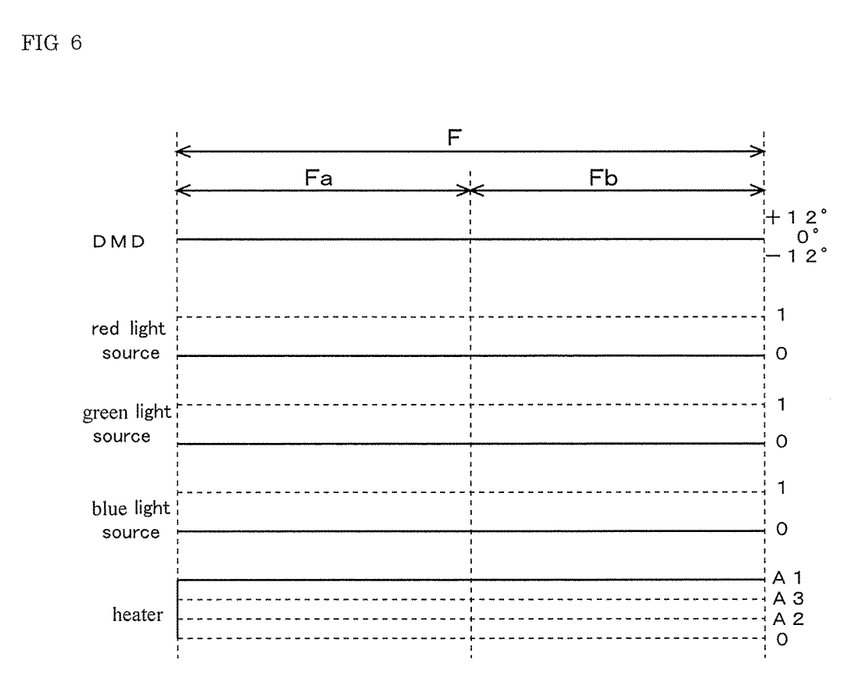
FIG. 6 is a time chart showing ON/OFF timings of the DMD, light sources, and a heater during low-temperature (high-temperature) non-display in the same embodiment.

In the low-temperature non-display mode, as shown in FIG. 6, the control unit 90 heats the DMD 30 by supplying current having a first current value A1 only to a heater 45, and stops supply of current to the DMD 30 and the light source 11. No current is supplied to each of the light sources 11r, 11g, 11b under control of the control unit 90, and the three light sources 11r, 11g, 11b are all turned off. Further, when the DMD 30 is in an OFF state, no current is supplied to the DMD 30 under control of the DMD driver 95, and each of the mirror elements 31 of the DMD 30 is maintained at the intermediate point. The first current value A1 is the maximum current allowed for driving the heater in the HUD device 1, and the heater 45 is driven by this maximum current. In the low-temperature non-display mode, the heater 45 is supplied with the first current value A1, so that the temperature of the DMD 30 can be quickly raised. Therefore, by quickly shifting the temperature of the DMD 30 from the low-temperature non-display range T3 to the low-temperature display range T2, it is possible to shift the control unit 90 from the non-display mode to the low-temperature display mode.

Figure 7:
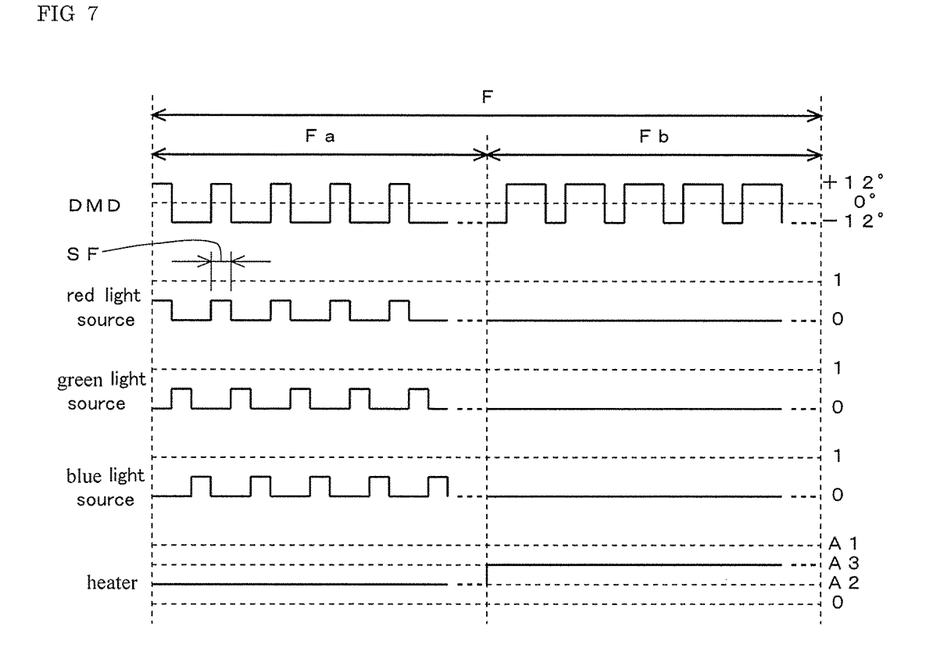
FIG. 7 is a time chart showing ON/OFF timings of the DMD, the light sources, and the heater during low-temperature (high-temperature) display in the same embodiment.
Figure 8:
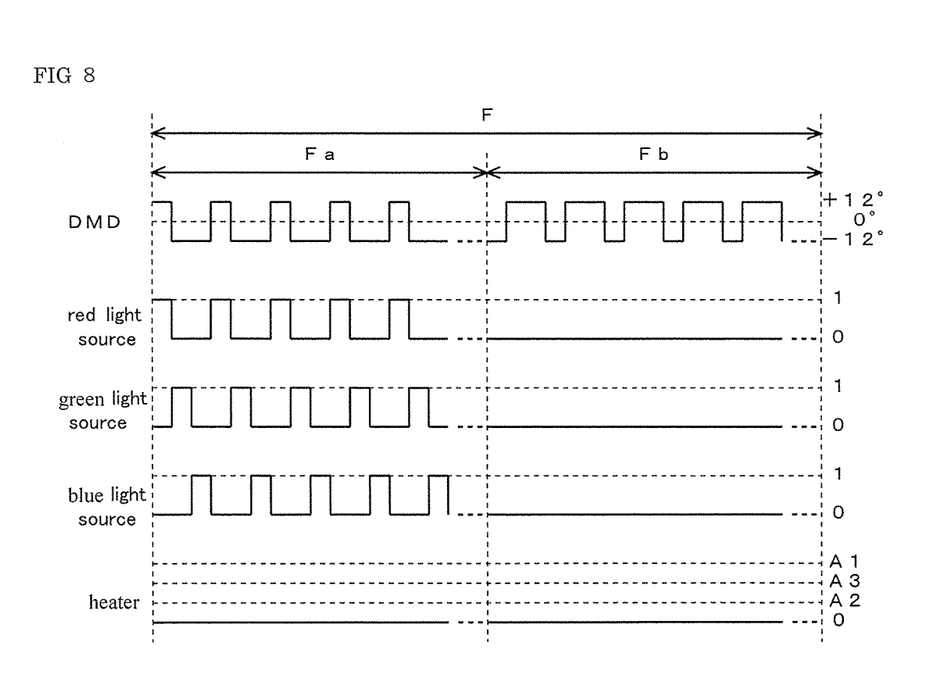
FIG. 8 is a time chart showing ON/OFF timings of the DMD, the light sources, and the heater during normal display in the same embodiment.

In the low-temperature display mode, as shown in FIG. 7, the control unit 90 controls the illumination device 10 for each frame F which is one unit obtained by dividing a control time, and the DMD driver 95 controls the DMD 30 based on the display control data of the control unit 90. Each frame F is composed of a display period Fa for displaying the display image M and a non-display period Fb for not displaying the display image M. In the display period Fa, the control unit 90 causes at least one of the three light sources 11r, 11g, 11b to emit light, and controls the illumination device 10 by a field-sequential method in which the three light sources 11r, 11g, 11b for emitting light are switched at predetermined time intervals. Assuming that the current is 1 in case of normal display described below, the current supplied to each of the light sources 11r, 11g, 11b is an output of about half the current. In the display period Fa, the color of the illumination light C is defined based on a ratio occupied by each light R, G, B. Note that FIGS. 6 to 8 shows a case where the DMD 30 displays red color as a representative example.

In the non-display period Fb, the control unit 90 turns off all the three light sources 11r, 11g, 11b. In the non-display period Fb, the control unit 90 outputs the display control data to the DMD driver 95, and the DMD driver 95 outputs a drive command to the DMD 30, to drive the mirror element 31 (change a tilt angle) at a predetermined cycle. Thus, it is possible to prevent the mirror element 31 from being fixed, and it is also expected that the temperature of the DMD 30 is adjusted so that the temperature of the DMD 30 does not fall within the low-temperature non-display range T3 due to heat generated by driving (energizing) the mirror element 31.

The control unit 90 turns on the heater 45 in the low-temperature display mode. In the display period Fa, the heater 45 is supplied with a second current value A2 lower than the first current value A1, and in the non-display period Fb, the heater 45 is supplied with a third current value A3 which is lower than or equal to the first current value A1 and higher than the second current value A2. In the low-temperature display mode, the heater 45 is turned on, so that the temperature of the DMD 30 can be raised, and further, in the non-display period Fb of the low-temperature display mode, the heater 45 is supplied with current corresponding to an amount in which supply of current to the light sources 11r, 11g, 11b is stopped, so that the temperature of the DMD 30 can be raised.

Therefore, the temperature of the DMD 30 is prevented from returning to the low-temperature non-display range T3 from the low-temperature display range T2, and it is possible to shift the temperature of the DMD 30 to the normal temperature range T1, thereby shifting the control section 90 from the low-temperature display mode to a normal temperature display mode. Further, in the display period Fa, the heater 45 and each of the light sources 11r, 11g, 11b are turned on, however, by suppressing the current value to be supplied to each of the light sources 11r, 11g, 11b as compared with the normal display, it is possible to prevent the current consumed in the HUD device 1 from being excessively large.

In the normal display mode, the DMD 30 repeats the display period Fa and the non-display period Fb for each frame F by the DMD driver 95 based on the display control data of the control unit 90. In each of the light sources 11r, 11g, 11b, the control unit 90 causes at least one of the three light sources 11r, 11g, 11b to emit light in the display period Fa, and controls the illumination device 10 by the field-sequential method in which the three light sources 11r, 11g, 11b for emitting light are switched at the predetermined time intervals. Note that the current supplied to each of the light sources 11r, 11g, 11b is different from that in the low-temperature display mode, and is a normal current output. Further, in the non-display period Fb, all the three light sources 11r, 11g, 11b are turned off.

In the normal display mode, no current is supplied to the heater 45, and the heater 45 is always turned off.

When the temperature of the DMD 30 is in the high-temperature display range T4 or the high-temperature non-display range T5, the HUD device 1 drives the cooling means 100 as the temperature adjustment unit instead of the heater 45 used at low temperature. In the high-temperature display mode, the control unit 90 will be described by replacing the heater shown in FIG. 7 with the cooling means.

The control unit 90 controls the illumination device 10 for each frame F which is one unit obtained by dividing the control time, and the DMD driver 95 controls the DMD 30 based on the display control data of the control unit 90. In the display period Fa, the control unit 90 causes at least one of the three light sources 11r, 11g, 11b to emit light, and controls the illumination device 10 by the field-sequential method in which the three light sources 11r, 11g, 11b for emitting light are switched at the predetermined time intervals. Assuming that the current is 1 in the case of the normal display described below, the current supplied to each of the light sources 11r, 11g, 11b is the output of about half the current. In the display period Fa, the color of the illumination light C is defined based on the ratio occupied by each light R, G, B.

In the non-display period Fb, the control unit 90 turns off all the three light sources 11r, 11g, 11b. In the non-display period Fb, based on the display control data of the control unit 90, the DMD driver 95 outputs the drive command to the DMD 30, to drive the mirror element 31 (change the tilt angle) at the predetermined cycle. Thus, it is possible to prevent the mirror element 31 from being fixed.

The control unit 90 turns on the cooling means 100 in the high-temperature display mode. In the display period Fa, the second current value A2 lower than the first current value A1 is supplied to the cooling means 100, and in the non-display period Fb, the third current value A3 smaller than or equal to the first current value A1 and higher than the second current value A2 is supplied to the cooling means 100. In the high-temperature display mode, the cooling means 100 is turned on, so that the temperature of the DMD 30 can be lowered, and further, in the non-display period Fb of the high-temperature display mode, the cooling means 100 is supplied with the current corresponding to the amount in which the supply of current to the light sources 11r, 11g, 11b is stopped, so that the temperature of the DMD 30 can be further lowered.

Therefore, the temperature of the DMD 30 is prevented from shifting from the high-temperature display range T4 to the high-temperature non-display range T5, and the temperature of the DMD 30 is shifted to the normal temperature range T1, so that the control unit 90 can shift from the high-temperature display mode to the normal temperature display mode. In the display period Fa, the cooling means 100 and the light sources 11r, 11g, 11b are turned on, however, by suppressing the current value to be supplied to each of the light sources 11r, 11g, 11b as compared with the normal display, it is possible to prevent the current consumed in the HUD device 1 from being excessively large.

The operation of the control unit 90 in the high-temperature non-display mode will be described by replacing the heater shown in FIG. 6 with the cooling means.

The control unit 90 supplies the current having the first current value A1 only to the cooling means 100 to cool the DMD 30 and stops the supply of current to the light source 11, and the DMD driver 95 stops driving of the DMD 30 based on the display control data of the control unit 90. No current is supplied to each of the light sources 11r, 11g, 11b under the control of the control unit 90, and the three light sources 11r, 11g, 11b are all turned off. Further, when the DMD 30 is in the OFF state, no current is supplied to the DMD 30 under the control of the DMD driver 95, and each mirror element 31 of the DMD 30 is maintained at the intermediate point. Thus, breakage of the DMD 30 is prevented. The first current value A1 is the maximum current allowed for the cooling means 100 in the HUD device 1, and the cooling means 100 is driven with this maximum current. In the high-temperature non-display mode, the cooling means 100 is supplied with the first current value A1, so that the temperature of the DMD 30 can be quickly lowered. Therefore, by promptly shifting the temperature of the DMD 30 from the high-temperature non-display range T5 to the high-temperature display range T4, it is possible to shift the control unit 90 from the non-display mode to the high-temperature display mode.

Note that a proportion of the display period Fa to the frame F in the low-temperature display mode, the normal display mode and the high-temperature display mode in the HUD device 1 of the embodiment described above is 50% in both the display period Fa and the non-display period Fb, however, it is not limited thereto, and a ratio between ON period and OFF period of each of a plurality of pixels in the non-display period Fb may be changed.

The DMD 30 is driven so that the ON period and the OFF period are 50% through the display period Fa and the non-display period Fb in the frame F, and thus the ON period of ±12° and the OFF period of −12° are equal. By driving the DMD 30 in this manner, the mirror element 31 of the DMD 30 is prevented from being fixed. Note that it is not necessary to strictly set the ratio between the ON period and the OFF period to 50%, and when they are substantially equal, it is sufficient to prevent the mirror element 31 from being fixed. For example, the ON period may be 45% and the OFF period may be 55%. Further, when the OFF period is set longer than the ON period, even when the mirror element 31 is fixed, possibility of the mirror element 31 being fixed in a direction in which light is not reflected is increased as compared with a case where the mirror element 31 is fixed in a direction in which light is reflected and a bright point is displayed, so that there is an effect that deterioration of display quality of the HUD device 1 is hardly caused.

The temperature ranges of the normal temperature range T1, the low-temperature display range T2, the low-temperature non-display range T3, the high-temperature display range T4 and the high-temperature non-display range T5 in the above embodiment can be appropriately changed. In the above embodiment, control by the control unit 90 is switched at a predetermined temperature. For example, when the temperature rises at −10° C., the control by the control unit 90 is switched from the low-temperature display to the normal display at −10° C., and when the temperature falls at −10° C., the control by the control unit 90 is switched from the normal display to the low-temperature display at −10° C. When the temperature around the display device 1 repeatedly rises and falls at a predetermined temperature of −10° C. or around −10° C., there is a possibility that switching of the control frequently occurs, and thus for example, when the temperature rises, the control is switched at a predetermined temperature, but when the temperature rises once and falls, the control may be switched at a temperature lower than the predetermined temperature, for example by 5° C. In other words, when the temperature rises, and falls after switching the control beyond −10° C., it is possible to prevent frequent switching of the control by switching the control at −5° C. or below −5° C. In this case, when the temperature rises, the control is switched at the predetermined temperature and when the temperature falls, the control is switched at the temperature lower than the predetermined temperature, however in contrast, when the temperature falls, the control is switched at the predetermined temperature and when the temperature rises, the control may be switched at a temperature higher than the predetermined temperature.

In the embodiment described above, the control unit 90 drives the red light source 11r, the green light source 11g, and the blue light source 11b in the display period Fa, however, the control unit 90 may turn on two of the three light sources 11r, 11g, 11b at a predetermined timing and maintain remaining one light source in a turned-off state in the display period Fa. Or, the control unit 90 may turn on one light source at a predetermined timing and maintain remaining two light sources in the turned-off state. Further, although the DMD 30 is controlled by the DMD driver 95 in the embodiment described above, the control unit 90 may incorporate a function corresponding to the DMD driver 95 and control the DMD 30.

Although the temperature sensor 41 detects the temperature of the DMD 30 in the embodiment described above, it may measure a temperature in the housing 80 or around the housing 80, which affects the temperature of the DMD 30. Further, the heater 45 and the cooling means 100 may be at a position away from the DMD 30 as long as the temperature of the display element 30 can be adjusted.

In the embodiment described above, the display device is the HUD device 1 for a car, but it is not limited thereto, but may be a HUD device mounted on a vehicle such as an airplane, a ship or the like. Further, a target to which the display light N from the HUD device 1 is projected is not limited to the windshield 2a, but may be a dedicated combiner. Furthermore, the display device may be a projector or the like used indoors or outdoors.

In the above descriptions, in order to facilitate understanding of the present invention, descriptions of known technical matters which are not important are appropriately omitted. The present invention is not limited by the embodiments described above. Modifications (including deletion of constituent elements) can be appropriately added without departing from the spirit and scope of the present invention.

INDUSTRIAL APPLICABILITY

The present invention can be used for the display device employing the DMD.

DESCRIPTION OF REFERENCE SIGNS AND NUMERALS

1 display device (HUD device)
2 vehicle
2a windshield
10 illumination device
11 light source
11b blue light source
11g green light source
11r red light source
20 illumination optical system
30 display element
31 reflection unit (mirror element)
40 temperature detection unit
45 temperature adjustment unit (heater)
50 projection optical system
60 screen
70 plane mirror
71 concave mirror
80 housing
90 control unit
94 illumination driver
95 DMD driver
100 cooling means
A1 first current value
A2 second current value
A3 third current value
C illumination light
F frame
Fa display period
Fb non-display period
M display image
N display light
SF subframe
T1 normal temperature range
T2 low-temperature display range
T3 low-temperature non-display range
T4 high-temperature display range
T5 high-temperature non-display range
T6 operable temperature range
V virtual image

The invention claimed is:

1. A display device for displaying a display image, comprising:
   light sources that emit light corresponding to the display image;
   a display element comprising reflection units that reflect the light from the light sources toward a screen by controlling an angle of each of the reflection units;
   a heater for providing heat to the display element;
   a temperature detection unit for detecting a temperature of the display element; and
   a control unit that controls the light source to emit light using a field-sequential method in which the light sources for emitting the light are sequentially switched, wherein
   when the detected temperature of the display element is less than a first temperature threshold, the display device enters a first mode in which the control unit:
      controls the light source to stop emitting the light corresponding to the display image by supplying no current to the light sources;
      controls the display element to stop reflecting the light corresponding to the display image by supplying no current to the display element; and
      controls the heater to provide the heat to the display element by supplying a first heater current amount to the heater.

2. The display device according to claim 1, wherein
   when the detected temperature of the display element is equal to or more than the first temperature threshold but less than a second temperature threshold, the display device enters a second mode, the second mode includes a non-display period in which the control unit:
      controls the light source to stop emitting the light corresponding to the display image by supplying no current to the light sources;
      controls the display element to control the angle of each of the reflection units by supplying a display element current amount to the display elements; and
      controls the heater to provide the heat to the display element by supplying a second heater current amount to the heater, wherein the second heater current amount is smaller than the first heater current amount, and
   the second mode of the display device further includes a display period in which the control unit:
      controls the light source to emit the light corresponding to the display image by supplying a first light source current amount to the plurality of light sources;
      controls the display element to control the angle of each of the reflection units by supplying the display element current amount to the display elements; and
      controls the heater to provide the heat to the display element by supplying a third heater current amount to the heater, wherein the third heater current amount is smaller than the second heater current amount.

3. The display device according to claim 2, wherein the display period and the non-display period alternate while the display device is in the second mode.

4. The display device according to claim 2, wherein when the detected temperature of the display element is equal to or more than the second temperature threshold, the display device enters a third mode in which the control unit:
- controls the light source to emit the light corresponding to the display image by supplying a second light source current amount to the plurality of light sources, wherein the second light source current amount is larger than the first light source current amount;
- controls the display element to control the angle of each of the reflection units by supplying the display element current amount to the display elements; and
- controls the heater to stop providing the heat to the display element by supplying no current to the heater.

* * * * *